No. 614,437. Patented Nov. 22, 1898.
S. BROCK.
PLANTER ATTACHMENT FOR CULTIVATORS.
(Application filed May 24, 1898.)
(No Model.)
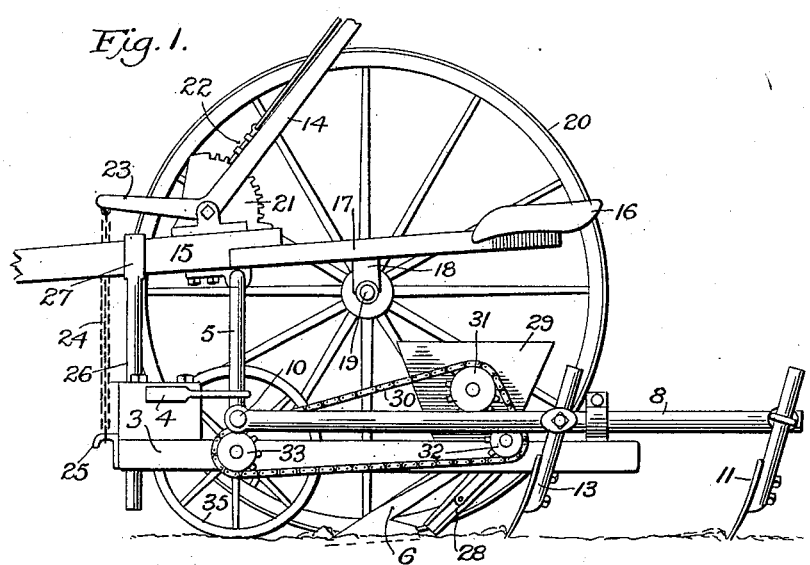
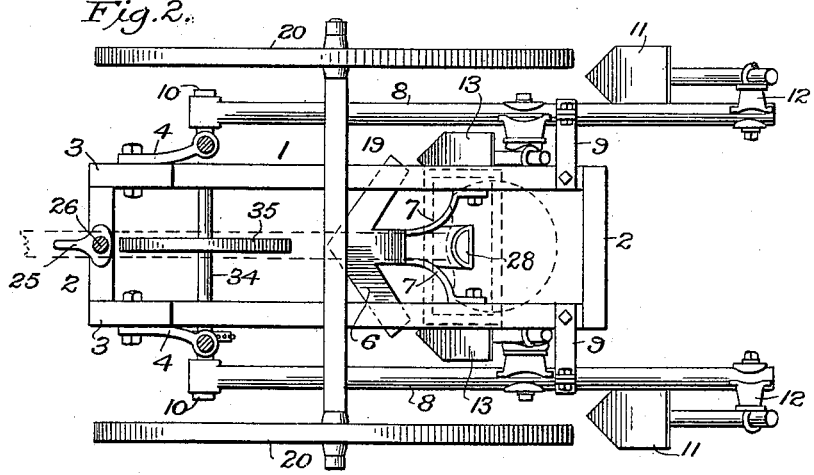
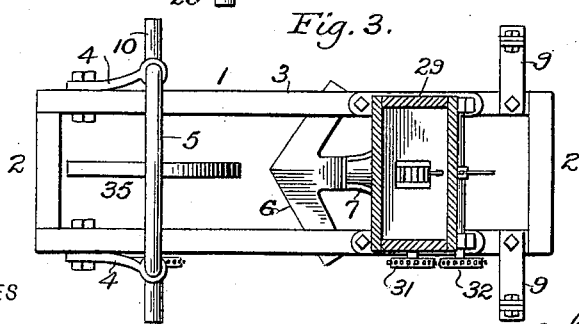
WITNESSES
INVENTOR
Samuel Brock,
BY
Fred E. Jacker
ATTORNEY

UNITED STATES PATENT OFFICE.

SAMUEL BROCK, OF WILLIAMSON COUNTY, TEXAS.

PLANTER ATTACHMENT FOR CULTIVATORS.

SPECIFICATION forming part of Letters Patent No. 614,437, dated November 22, 1898.

Application filed May 24, 1898. Serial No. 681,584. (No model.)

*To all whom it may concern:*

Be it known that I, SAMUEL BROCK, a citizen of the United States, residing in the county of Williamson and State of Texas, have invented certain new and useful Improvements in Corn and Cotton Planter Attachments for Cultivators; and I do hereby declare the following to be a full, clear, and exact description of the invention, such as will enable others skilled in the art to which it appertains to make and use the same.

This invention relates to an improvement in a cotton and corn planting attachment for riding and walking cultivators, the object of the invention being to provide a cheap and efficient machine of the class referred to; and the invention therefore consists, essentially, in the construction, arrangement, and combination of parts substantially as will be hereinafter described and claimed.

In the annexed drawings, illustrating my invention, Figure 1 is a side elevation of my improved cotton and corn planter. Fig. 2 is a top plan view of the same. Fig. 3 is a partial plan view with certain parts shown in section.

Like numerals of reference denote like parts in all the figures.

As a portion of the framework of my machine there is provided a rectangular horizontal frame consisting of the longitudinal side pieces 1 1 and the end connections 2 2. Upon this frame, near the front end thereof, are mounted blocks 10 10, to which are securely fastened, by means of bolts, the short rearwardly-extending arms or angle-pieces 4 4, that loosely clasp, as shown, the vertical arched rod 5, on which rests a part of the machine, as the tongue 15, said arrangement serving to keep the forward part of my invention in position.

6 denotes a plow or sweep seated upon bars 7 7, which approach close together below for the purpose of receiving the said plow and curve outwardly as they ascend to the point where they are bolted firmly right and left upon the inside edges of the side bars 1 1 of the rectangular frame already mentioned.

The rectangular frame, consisting of sides 1 1 and ends 2 2, is situated between the beams 8 8 of the cultivator, said beams being firmly connected with the said frame near its rear end by means of the strong metallic bars 9 9, that are bolted at their inner ends firmly to bars 1 1 and at their outer ends are shaped with split sleeves that tightly clasp the beams 8 8. (See Fig. 2.) The front ends of beams 8 8 connect, by means of bolts 10 10, with the lower ends of the arched rod 5, and the rear extremities of said beams 8 8 carry the plows 11 11, that are supported by the couplings 12 12. The beams 8 8 also carry other plows 13 13, supported thereon at points on the opposite side of the bars 9 9 from where the plows 11 11 are located, said plows 13 13 being behind and a little to one side of the plow 6.

The central plow 6 is fixed upon a rigid foot that is not breakable, nor is it provided with slots in the supporting-bars that curve upward for the purpose of raising or lowering said plow for deeper or shallower plowing. The important means for regulating the height or depth of the plow in order to adjust the latter to cut a furrow of the desired depth consists of a lever-handle 14, pivotally mounted upon the tongue 15 within easy reach of the driver, who occupies the seat 16 upon the rearward extension 17, that projects backward from tongue 15 and rests at 18 upon the axle 19 of the wheels 20 20. The frame is provided with a toothed sector 21, adapted to be engaged by a pawl 22 on lever 14 for the purpose of holding the lever in any desired position. Said lever has an arm 23, that connects by a chain 24 with a hook 25 on the front end of the rectangular frame 1 2, so that in this way the front end of the frame 1 2 is easily raised or lowered by manipulating the lever-handle 14. It has already been stated that the short arms 4 4 loosely embrace the arch 5. Thus when the frame 1 2 moves up or down the arms 4 4 slide upon and are guided by the said arch 5.

26 designates a strong vertical rod having at its upper end a collar 27, that surrounds the tongue 15. This rod 26 passes loosely through a perforation in the hook-plate 25, that is upon the front end of frame 1 2, and likewise through the frame-bar 2, and thus has a true and steady up-and-down play.

Underneath the frame 1 2 is a delivery spout or chute 28 for dropping the corn or other seed that is to be planted. This chute 28 is not provided with a small plow immediately in front, as such small plow is unnecessary in my present invention and its omission is one of the improved features that I now lay claim to. Furthermore, in my improvements I do not employ the small plows at the rear which are so commonly found in other planters in use to-day, as the inside plows 13 13 are used for coverers.

A suitably-supported box or hopper 29 contains the corn, cotton-seed, or other material that is to be planted. Within this hopper is an agitating device for stirring up the cotton-seed, and it is operated by the chain 30 passing over the sprocket-wheel 31 and the other sprockets or gears 32 and 33. The sprocket-wheel 33 is on the shaft 34, that is supported in the rectangular frame 1 2 and that carries the wheel 35, the revolution of which, in contact with the ground, actuates the chain 30 and causes the stirrer within hopper 29 to feed the seed regularly into the spout 28, whence it is discharged into the furrows prepared by the plow.

Numerous changes may be made in the precise arrangement and combination of the various parts of my invention without departing from the scope of the same, and I reserve the liberty of varying the details in such manner as may be found necessary.

Having thus described my invention, what I claim as new, and desire to secure by Letters Patent, is—

In a corn and cotton planter, the combination with the main plow-beams, of a vertically-adjustable frame interposed and supported between the same; a plow and hopper carried by the adjustable frame, a stirrer within said hopper, a ground-wheel journaled in the adjustable frame, connections between said wheel and agitator for operating the latter, an arched axle connecting the main beams, arms rearwardly extending from the adjustable frame and loosely embracing the vertical portions of the arched axle, a toothed sector supported over the arched axle, a hand-lever, having an angular arm extending from the same, working in said sector, a hook or projection extending from the front cross-beam of the adjustable frame, and a connection between said projection and angular arm for raising or depressing the adjustable frame, substantially as described.

In testimony whereof I affix my signature in presence of two witnesses.

SAMUEL BROCK.

Witnesses:
M. B. McClain,
H. E. Willson.